United States Patent
Attar et al.

(10) Patent No.: US 8,275,408 B2
(45) Date of Patent: Sep. 25, 2012

(54) POWER CONTROL IN A WIRELESS COMMUNICATION SYSTEM

(75) Inventors: Rashid Ahmed Akbar Attar, San Diego, CA (US); Donna Ghosh, San Diego, CA (US); Christopher Gerard Lott, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 459 days.

(21) Appl. No.: 12/547,974

(22) Filed: Aug. 26, 2009

(65) Prior Publication Data

US 2010/0056197 A1 Mar. 4, 2010

Related U.S. Application Data

(60) Provisional application No. 61/092,208, filed on Aug. 27, 2008.

(51) Int. Cl.
*H04B 7/00* (2006.01)
(52) U.S. Cl. ....... 455/522; 455/69; 455/561; 455/67.11; 370/318; 370/329
(58) Field of Classification Search .................... 455/69, 455/522, 520, 424, 425, 452.2, 453, 456.2, 455/456.5, 456.6, 458, 464, 9, 13.4, 512, 455/67.11, 67.13, 67.16, 68, 115.1, 115.3, 455/114.2, 135, 127.1; 370/318, 252, 281, 370/400, 334, 346
See application file for complete search history.

(56) References Cited

U.S. PATENT DOCUMENTS

| | | | |
|---|---|---|---|
| 2003/0123401 A1* | 7/2003 | Dean | 370/318 |
| 2004/0095907 A1* | 5/2004 | Agee et al. | 370/334 |
| 2006/0141935 A1* | 6/2006 | Hou et al. | 455/63.1 |
| 2007/0015476 A1* | 1/2007 | Akbar Attar et al. | 455/127.1 |
| 2007/0041429 A1* | 2/2007 | Khandekar | 375/146 |
| 2007/0147331 A1* | 6/2007 | Bi et al. | 370/346 |
| 2007/0150799 A1 | 6/2007 | Sutivong et al. | |
| 2007/0201405 A1* | 8/2007 | Santhanam | 370/335 |
| 2008/0002602 A1* | 1/2008 | Chen et al. | 370/318 |
| 2009/0176530 A1* | 7/2009 | Gandhi et al. | 455/561 |
| 2010/0220614 A1* | 9/2010 | Seong et al. | 370/252 |

FOREIGN PATENT DOCUMENTS

| | | |
|---|---|---|
| EP | 1933474 | 6/2008 |
| WO | WO2007112416 | 10/2007 |

OTHER PUBLICATIONS

International Search Report/Written Opinion—PCT/US09/055219—International Search Authority EPO—Dec. 15, 2009.

* cited by examiner

*Primary Examiner* — Tan Trinh

(57) ABSTRACT

In a wireless communications system, a serving base station performs outer and closed power control for an overhead channel and a traffic channel for data, either of which can carry an acknowledgement (Ack) channel and Channel Quality Indicator (CQI) channel on an uplink from User Equipment (UE). In an exemplary aspect, data packet communication is implemented in 3GPP LTE Rel. 8 wherein the uplink has a Single Carrier Frequency Division Multiplex (SC-FDM) uplink waveform. The UE performs open loop power control by a determining transmit power spectral density value by using received energy per symbol for a reference signal.

46 Claims, 14 Drawing Sheets

POWER CONTROL IN A WIRELESS COMMUNICATION SYSTEM

CLAIM OF PRIORITY UNDER 35 U.S.C. §119

The present application for patent claims priority to Provisional Application No. 61/092,208 entitled "UPLINK POWER CONTROL IN A WIRELESS COMMUNICATION SYSTEM" filed Aug. 27, 2008, and assigned to the assignee hereof and hereby expressly incorporated by reference herein.

BACKGROUND

1. Field

The present disclosure relates generally to communication, and more specifically to controlling transmit power in a wireless communication system.

2. Background

The 3rd Generation Partnership Project (3GPP) Long Term Evolution (LTE) represents a major advance in cellular technology and is the next step forward in cellular 3G services as a natural evolution of a Global system for mobile communications (GSM) and a Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on the spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an enhanced base station (eNodeB) and mobile user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Given increasing deployments of heterogeneous networks, transmit power control is becoming a greater challenge, successfully being received by an intended recipient without causing undue interference to others. In advanced communication protocols such as LTE, setting an appropriate transmit power creates challenges due to the number of control and data channels that are transmitted. In particular, it is desirable to minimize user equipment (UE) transmit power while achieving desired traffic and overhead performance on an uplink (UL) channel.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with uplink power control, both internal and external.

In one aspect, a method is provided for transmitting an uplink in a wireless communication system by employing a processor executing computer executable instructions stored on a computer readable storage medium to implement the following acts: A reference signal (e.g., pilot) is received on a downlink. A transmit power spectral density value is determined using received energy per symbol for the reference signal. Open loop power control is performed for an uplink of an overhead channel and a traffic channel based upon the transmit power spectral density value. Channel quality feedback is transmitted subject to the transmit power spectral density value determined by open loop power control on either the overhead channel or the traffic channel.

In another aspect, a computer program product is provided for transmitting an uplink in a wireless communication system. At least one computer readable storage medium stores computer executable instructions that, when executed by at least one processor, implement components: A first set of codes receives a reference signal on a downlink. A second set of codes determines a transmit power spectral density value by using received energy per symbol for the reference signal. A third set of codes performs open loop power control for an uplink of an overhead channel and a traffic channel based upon the transmit power spectral density value. A fourth set of codes transmits a channel quality feedback that is subject to the transmit power spectral density value determined by open loop power control on either the overhead channel or the traffic channel.

In an additional aspect, an apparatus is provided for transmitting an uplink in a wireless communication system. At least one computer readable storage medium stores computer executable instructions that, when executed by at least one processor, implement components: Means are provided for receiving a reference signal on a downlink. Means are provided for determining a transmit power spectral density value by using received energy per symbol for the reference signal. Means are provided for performing open loop power control for an uplink of an overhead channel and a traffic channel based upon the transmit power spectral density value. Means are provided for transmitting a channel quality feedback that is subject to the transmit power spectral density value determined by open loop power control on either the overhead channel or the traffic channel.

In a further aspect, an apparatus is provided for transmitting an uplink in a wireless communication system. A receiver receives a reference signal on a downlink. A computing platform determines a transmit power spectral density value by using received energy per symbol for the reference signal and performs open loop power control for an uplink of an overhead channel and a traffic channel based upon the transmit power spectral density. A transmitter transmits a channel quality feedback that is subject to the transmit power spectral density value determined by open loop power control on either the overhead channel or the traffic channel.

In yet one aspect, a method is provided for receiving an uplink in a wireless communication system by employing a processor executing computer executable instructions stored on a computer readable storage medium to implement the following acts: A channel quality feedback is received on an uplink from a user equipment on a determined one of an overhead channel and a traffic channel. A detection confidence value is determined for the channel quality feedback. Outer loop power control is performed for the determined one of the overhead channel and traffic channel to maintain the detection confidence value at a target. A command is transmitted to the user equipment to adjust the transmit power of a selected one of the overhead channel and traffic channel that carries the channel quality feedback uplink in accordance to performing outer loop power control.

In yet another aspect, a computer program product is provided for receiving an uplink in a wireless communication system. At least one computer readable storage medium stores computer executable instructions that, when executed by at least one processor, implement components: A first set of codes receives a channel quality feedback on an uplink from user equipment on a determined one of an overhead channel and a traffic channel. A second set of codes determines a detection confidence value for the channel quality feedback. A third set of codes performs outer loop power control for the determined one of the overhead channel and traffic channel to maintain the detection confidence value at a target. A fourth set of codes transmits a command to the user equipment to adjust a transmit power of a selected one of the overhead channel and traffic channel that carries the channel quality feedback uplink in accordance to performing outer loop power control.

In yet an additional aspect, an apparatus is provided for receiving an uplink in a wireless communication system. At least one computer readable storage medium stores computer executable instructions that, when executed by at least one processor, implement components. Means are provided for receiving a channel quality feedback on an uplink from user equipment on a determined one of an overhead channel and a traffic channel. Means are provided for determining a detection confidence value for the channel quality feedback. Means are provided for performing outer loop power control for the determined one of the overhead channel and traffic channel to maintain the detection confidence value at a target. Means are provided for transmitting a command to the user equipment to adjust a transmit power of a selected one of the overhead channel and traffic channel that carries the channel quality feedback uplink in accordance to performing outer loop power control.

In yet a further aspect, an apparatus is provided for receiving an uplink in a wireless communication system. A receiver receives a channel quality feedback on an uplink from user equipment on a determined one of an overhead channel and a traffic channel. A computing platform determines a detection confidence value for the channel quality feedback and performs outer loop power control for the determined one of the overhead channel and traffic channel to maintain the detection confidence value at a target. A transmitter transmits a command to the user equipment to adjust a transmit power of a selected one of the overhead channel and traffic channel that carries the channel quality feedback uplink in accordance to performing outer loop power control.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
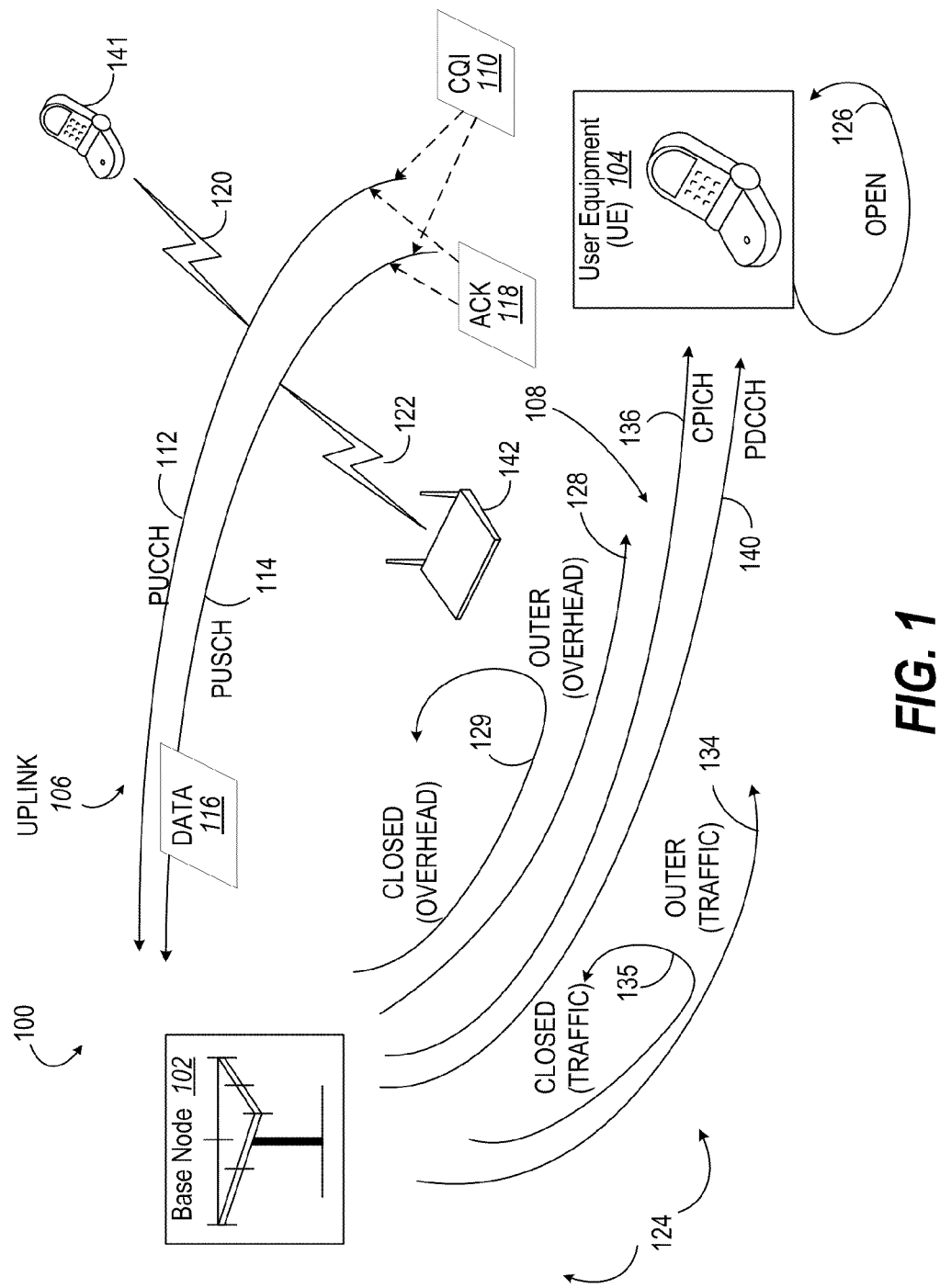
FIG. 1 illustrates a block diagram of a wireless communication system performing open, outer and closed loop transmit power control for an uplink in a wireless communication system.

In FIG. 1, a wireless communications system 100 provides for a serving base station, depicted as an evolved Base Node (eNB) 102 to schedule User Equipment (UE) 104 using an uplink 106 via a downlink 108. In an exemplary aspect, data packet communication is implemented in LTE Rel. 8 wherein the uplink 106 accommodates a Single Carrier Frequency Division Multiplex (SC-FDM) uplink waveform. In particular, the UE 104 is capable of reporting feedback on downlink interference, depicted as Channel Quality Indictor (CQI) channel 110 on either an overhead channel, depicted as a Physical Uplink Control Channel (PUCCH) 112, or a traffic (i.e., data) channel, depicted as a Physical Uplink Shared Channel (PUSCH) 114, which can also carry packet data 116. The UE 104 is also capable of acknowledging (Ack) successful receipt of packet data or explicitly not acknowledging (Nak) receipt of packet data on an Ack channel 118 on either the overhead channel (e.g., PUCCH) 112 or traffic channel (e.g., PUSCH) 114.

Since overhead and traffic channels 112, 114 are different parts of the uplink bandwidth, Ack and CQI symbols can be subject to different interference 120, 122 that requires compensation depending on where carried. A transmit power control system 124 addresses various combinations of use and contingencies to mitigate this interference without using excessive transmit power. To that end, the UE 104 runs open-loop power control (e.g., algorithm) 126 at all times for both control and traffic (i.e., data) channels. Alternatively or in addition, an outer loop and closed loop power control (e.g., algorithm) 128, 129 is performed interactively by the eNB 102 and UE 104 for the overhead channel 112, which can include uplink CQI and ACK channels 110, 118. Alternatively or in addition, an outer loop and closed loop power control (e.g., algorithm) 134, 135 is performed interactively by the eNB 102 and UE 104 for the uplink traffic channel 114, which can include uplink CQI and ACK channels 110, 118. In an exemplary aspect, an applicable outer and closed loop power control 128, 129, 134, 135 is run by the eNB 102 and UE 104 in addition to the open loop power control 126.

With regard to the open loop power control 126 for uplink overhead and traffic channels 112, 114, the UE 104 calculates open loop based transmit power spectral density (PSD) using the received energy per symbol (Es) on a reference signal (e.g., Common Pilot Channel (CPICH) (LTE, Rel. 8)) 136. (For example, PSD is a function of assigned bandwidth for fixed MCS and termination target.) An exemplary calculation for the transmit PSD "OpenLoopAdjust (i.e., open loop turn-around constant) value" is described below for Eqns. 1-2 that is configured by the base station (eNB) 102 based on its noise figure, operating Interference Over Thermal (IOT) noise point, etc.

With regard to outer loop power control algorithm 128 for uplink overhead channels, in one aspect an outer loop algorithm maintains a desired target CQI erasure rate at the base station receiver.

In another aspect, when CQI is transmitted in the uplink control channel PUCCH, the outer loop adjusts the received PUCCH pilot Signal-to-Noise Ratio (SINR) setpoint at the base station so that target erasure rate on CQI is maintained. When CQI is erased, the base station increases the PUCCH pilot SINR setpoint, otherwise the base station decreases the PUCCH pilot SINR setpoint. The ratio of up to down step sizes (increments) results in the desired CQI target erasure rate. With regard to closed loop power control algorithm 129 for uplink overhead channels, in one aspect when CQI is transmitted in the PUCCH, the base station transmits UP/DOWN power control commands to maintain the PUCCH Pilot SINR at target set by outer loop.

In an additional aspect, when CQI is transmitted in the uplink traffic channel PUSCH, one algorithm can provide that the outer loop adjusts the gain of the CQI modulation symbol (s) so that the target erasure rate on CQI is maintained. Another algorithm can provide that the outer loop adjusts the uplink traffic channel PUSCH pilot SINR setpoint such that the target CQI erasure rate and the target data channel Block Error Rate (BLER) at the desired number of sub-packets is achieved. It should be noted that in an exemplary aspect the CQI channel and data channel performance are not maintained independently, but in fact a single variable (e.g., the PUSCH pilot SINR setpoint) is used to jointly control both. Thus, if the CQI channel, for example, has worse interference than the data channel, then the CQI channel SINR will govern the PUSCH pilot SINR setpoint and may in fact lead to much lower BLER than the desired BLER on the traffic channel.

In a further aspect for outer loop power control algorithm 128 for uplink overhead channels, the CQI gain can be adjusted when CQI switches from being transmitted on PUCCH to PUSCH, and vice-versa. In addition to the adjust the values outlined below, an additional power boost may be applied for CQI at transition due to the Single Carrier Frequency Division Multiplex (SC-FDM) nature of waveform, and the adjust value also accounts for the Broadband Pilot Channel (BPICH) target SINR and the PUCCH Pilot target SINR difference. (BPICH can also refer to a Sounding Reference Signal (SRS), i.e., wideband channel sounding.) For example, CQI gain can be adjusted when CQI switches from PUCCH to PUSCH. The gain is adjusted by the difference in transmit powers between BPICH (over entire BW) and PUCCH Pilot transmit power. For another example, CQI gain can be adjusted when CQI switches from PUSCH to PUCCH. The gain is adjusted by the difference in transmit powers between BPICH (over PUCCH Resource Blocks (RBs)) and PUSCH Pilot Transmit (Tx) power. (In an exemplary aspect, a Resource Block can be 180 kHz (12 tones×15 kHz/tone).) With regard to closed loop 129, when CQI is transmitted in the PUSCH, the base station transmits UP/DOWN power control commands to maintain CQI modulation symbol SINR at a target set by the outer loop.

In yet another aspect for the overhead channels, the ACK gain can be always set relative to CQI gain in order to ensure that the desired target NAK-to-ACK error rate given the desired target CQI erasure rate can be maintained.

In another aspect regarding closed loop 129 for the overhead channels, the base station can use a Physical Downlink Control Channel (PDCCH) 140 to transmit overhead closed loop power control commands using grouped power control.

With regard to the outer loop power control algorithm 134 for the uplink traffic channel, in a first aspect, the outer loop sets the PUSCH Pilot SINR setpoint to ensure that the target traffic BLER is achieved at the desired number of sub-packets. The PUSCH pilot SINR setpoint is increased when the target BLER at the desired number of sub-packets is not achieved, and increased otherwise. The ratio of up to down denotes the BLER target and the step sizes are set carefully to ensure smooth dynamics and low setpoint bias. In another aspect, the outer loop sets the PUSCH Pilot SINR setpoint to ensure both that the target traffic BLER is achieved at the desired number of sub-packets and that the target CQI erasure rate is achieved when CQI is transmitted along with data in the PUSCH channel.

Closed loop power control algorithm 135 for the uplink traffic channel in one aspect can ensure that the PUSCH Pilot SINR is maintained at the desired level set by the outer loop algorithm 136. The rate of the closed loop power control algorithm 135 can be determined by the base station (eNB) 102 based on the downlink PDCCH overhead. In another aspect, additional adjustments to the transmit delta-PSD for sub-packets within a packet can be set by the base station 102 to handle other-cell interference caused by a given UE 141, 142. (Delta PSD is an adjustment to PSD relative to nominal PSD for a given Modulation and Coding Scheme (MCS).)

In an exemplary aspect, CQI or ACK SINR can be provided by the following relationship: $Pilot_{PUCCH}$ OR $Pilot_{PUSCH} \times$ Modulation Symbol Gain with respect to Pilot. For clarity, assumptions regarding a baseline implementation can include for PUCCH that there is no BPICH transmission, and that CQI and ACK are jointly coded when transmitted together. For PUSCH, BPICH (if transmitted) is Time Division Multiplexed (TDM'd) with other OFDM symbols. There is equal gain on all OFDM symbols. Gain on overhead symbols (punctured into data) and data symbols in PUSCH may be controlled independently. The same modulation is used for data symbols and overhead symbols in PUSCH.

In another aspect, PUCCH is as described for the baseline. PUSCH is generally the same as the baseline except that equal gain is provided on overhead symbols (punctured into data) and data symbols.

In an additional aspect, BPICH (if transmitted) is TDM'd with other OFDM symbols (PUCCH and PUSCH). BPICH gain can be controlled independent of other OFDM symbols (PUCCH and PUSCH). For PUCCH, CQI and ACK are independently power controlled. For PUSCH, gain on overhead symbols (punctured into data) and data symbols in PUSCH can be controlled independently. Overhead modulation is not a function of data modulation. The aforementioned features are summarized in TABLE 1:

TABLE 1

| | Baseline | Worst-Case | Best-Case |
|---|---|---|---|
| Open Loop Power Control | $TxPSD_{UL} = E_{S, reference\_signal} + RxPSD_{UL} + TxPSD_{DL} + NF_{NodeB} + (NoW)_{NodeB} - IoT$ Updated every TTI --- 1-Tap IIR filter with suitable time constant | | |
| PUCCH | No BPICH Transmission | No BPICH Transmission | BPICH (if transmitted) TDM'ed with other OFDM symbols |
| | n/a | n/a | BPICH gain can be controlled independent of other OFDM symbols |
| PUSCH | CQI & ACK jointly coded when transmitted together | CQI & ACK jointly coded when transmitted together | CQI & ACK independently power controlled |
| | BPICH (if transmitted) TDM'ed with other OFDM symbols | BPICH (if transmitted) TDM'ed with other OFDM symbols | BPICH (if transmitted) TDM'ed with other OFDM symbols |
| | Equal gain on all OFDM symbols | Equal gain on all OFDM symbols | BPICH gain can be controlled independent of other OFDM symbols |
| | Gain on overhead symbols (punctured into data) and data symbols may be controlled independently | Equal gain on overhead symbols (punctured into data) and data symbols | Gain on overhead symbols (punctured into data) and data symbols may be controlled independently |
| | Same modulation for data symbols and overhead symbols | Same modulation for data symbols and overhead symbols | Overhead modulation not a function of data modulation |

Figure 2:
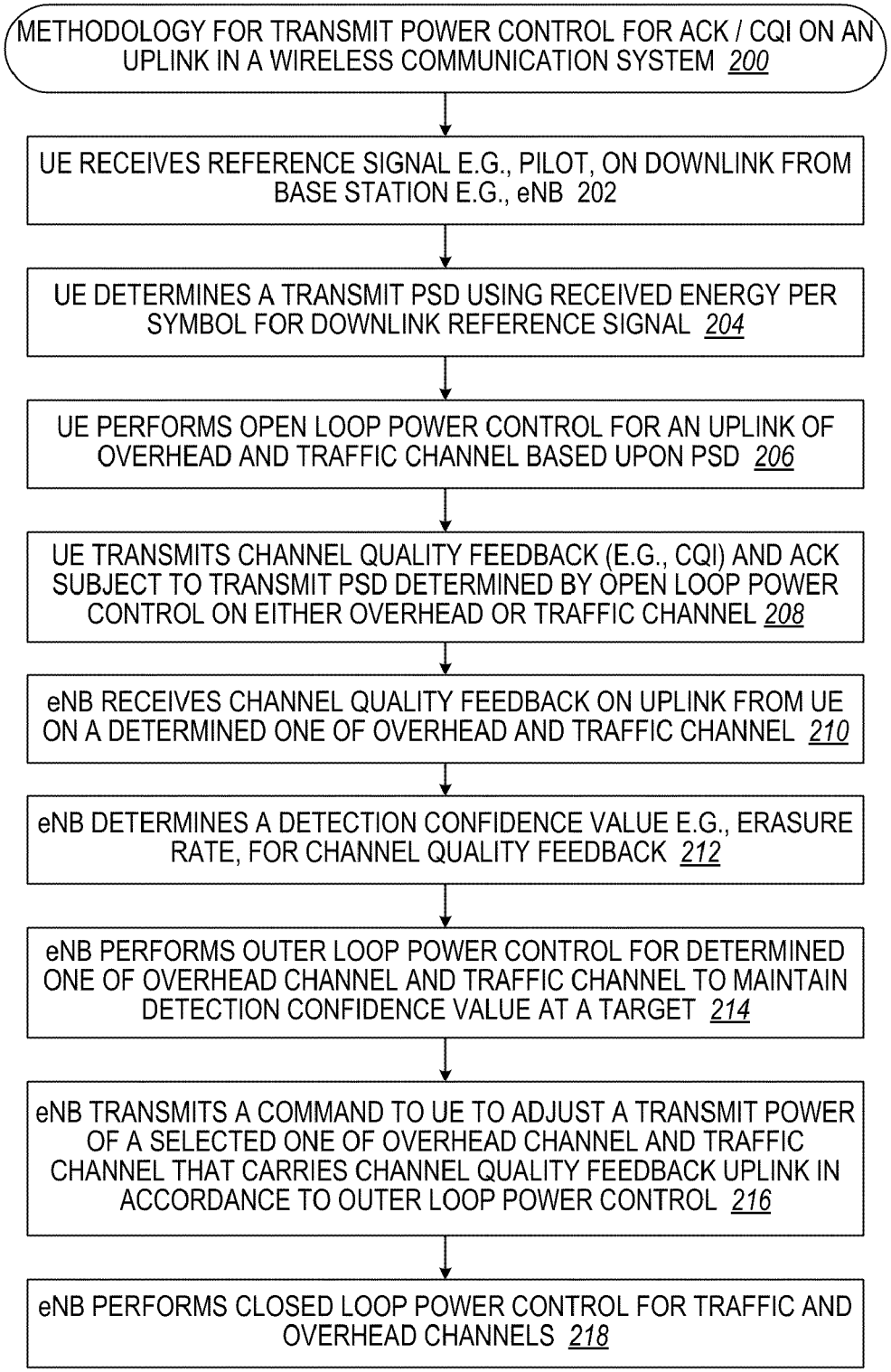
FIG. 2 illustrates a flow diagram for a methodology or sequence of operations for transmit power control for an uplink in a wireless communication system.

In FIG. 2, a methodology or sequence of operations 200 is provided for transmit power control for Ack and CQI on an uplink in a wireless communication system. A UE receives a reference signal (e.g., pilot) on the downlink from a base station (e.g., eNB) (block 202). The UE determines a transmit power spectral density using received energy per symbol for the reference signal (block 204). The UE performs open loop power control for an uplink of an overhead channel and a traffic channel based upon the transmit power spectral density (block 206). For instance, the UE can perform open loop power control based upon an open loop adjust value determined to be equal to an uplink receive power spectral density ($RxPSD_{ul}$) value for a user equipment plus a downlink transmit power spectral density ($TxPSD_{DL}$) value for a serving node plus a noise figure ($NF_{NodeB}$) at the serving node plus a noise over (($NOW)_{NodeB}$) figure at the serving node minus an uplink interference-over-thermal noise (IoT) value at the serving node. The UE transmits a channel quality feedback (e.g., CQI) and an acknowledgement (Ack) respectively subject to the transmit power spectral density determined by open loop power control on either the overhead channel or the traffic channel (block 208).

The eNB receives the channel quality feedback on the uplink from the UE on a determined one of an overhead channel and a traffic channel (block 210). The eNB determines a detection confidence value (e.g., erasure rate) for the channel quality feedback (block 212). The eNB performs outer loop power control for the determined one of the overhead channel and traffic channel to maintain the detection confidence value at a target (block 214). The eNB transmits a command to the user equipment to adjust a transmit power of a selected one of the overhead channel and traffic channel that carries the channel quality feedback uplink in accordance to performing outer loop power control (block 216). The eNB performs closed loop power control for the traffic and overhead channels (block 218).

Figure 3:
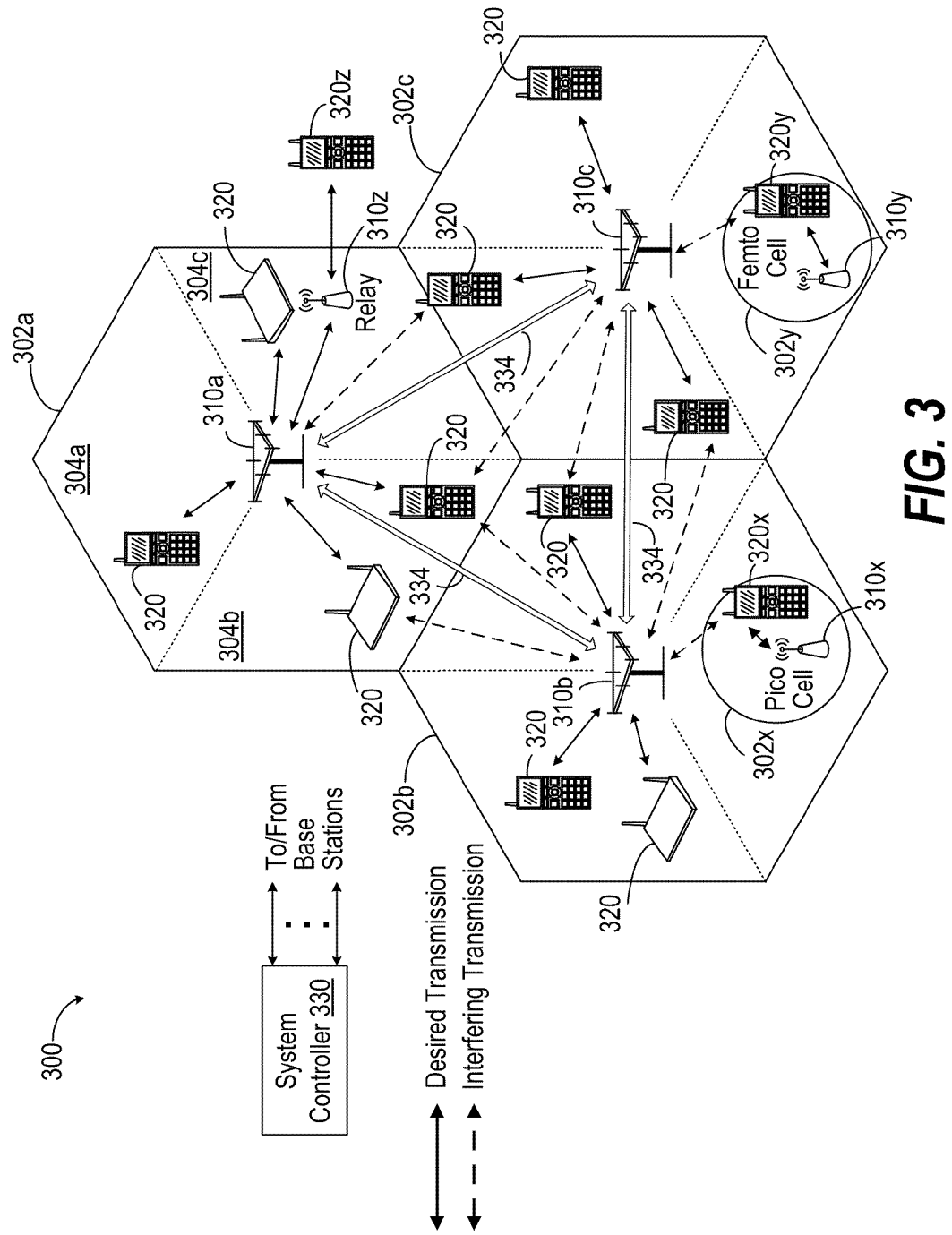
FIG. 3 illustrates a diagram of a wireless communication system comprising macro cells, femto cells and pico cells.

In the example shown in FIG. 3, base stations 310a, 310b and 310c may be macro base stations for macro cells 302a, 302b and 302c, respectively. Base station 310x may be a pico base station for a pico cell 302x communicating with terminal 320x. Base station 310y may be a femto base station for a femto cell 302y communicating with terminal 320y. Although not shown in FIG. 3 for simplicity, the macro cells may overlap at the edges. The pico and femto cells may be located within the macro cells (as shown in FIG. 3) or may overlap with macro cells and/or other cells.

Wireless network 300 may also include relay stations, e.g., a relay station 310z that communicates with terminal 320z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 330 may couple to a set of base stations and provide coordination and control for these base stations. Network controller 330 may be a single network entity or a collection of network entities. Network controller 330 may communicate with base stations 310 via a backhaul. Backhaul network communication 334 can facilitate point-to-point communication between base stations 310a-310c employing such a distributed architecture. Base stations 310a-310c may also communicate with one another, e.g., directly or indirectly via a wireless or wireline backhaul.

Wireless network 300 may be a homogeneous network that includes only macro base stations (not shown in FIG. 3). Wireless network 300 may also be a heterogeneous network that includes base stations of different types, e.g., macro base stations, pico base stations, home base stations, relay stations, etc. These different types of base stations may have different transmit power levels, different coverage areas, and different impact on interference in wireless network 300. For example, macro base stations may have a high transmit power level (e.g., 20 Watts) whereas pico and femto base stations may have a low transmit power level (e.g., 9 Watt). The techniques described herein may be used for homogeneous and heterogeneous networks.

Terminals 320 may be dispersed throughout wireless network 300, and each terminal may be stationary or mobile. A terminal may also be referred to as an access terminal (AT), a mobile station (MS), user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 3, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 300 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 302a, 302b, or 302c corresponding to a respective base station 310a-310c can be partitioned into multiple smaller areas (e.g., areas 304a, 304b, and 304c). Each of the smaller areas 304a, 304b, and 304c can be served by a respective base transceiver subsystem (BTS, not shown). As used herein and generally in the art, the term "sector" can refer to a BTS and/or its coverage area depending on the context in which the term is used. In one example, sectors 304a, 304b, 304c in a cell 302a, 302b, 302c can be formed by groups of antennas (not shown) at base station 310, where each group of antennas is responsible for communication with terminals 320 in a portion of the cell 302a, 302b, or 302c. For example, a base station 310 serving cell 302a can have a first antenna group corresponding to sector 304a, a second antenna group corresponding to sector 304b, and a third antenna group corresponding to sector 304c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 4:
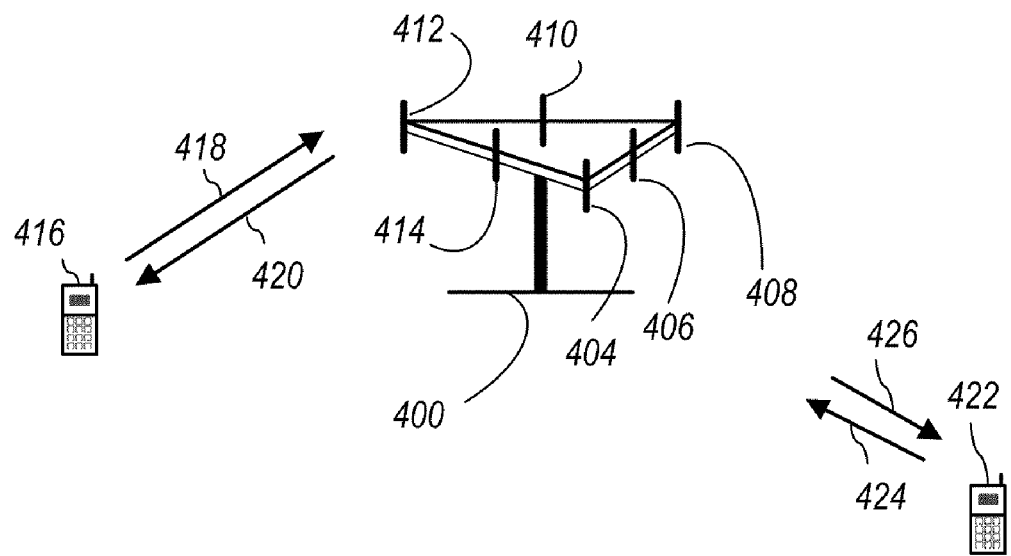
FIG. 4 illustrates a diagram of a multiple access wireless communication system.

Referring to FIG. 4, a multiple access wireless communication system according to one aspect is illustrated. An access point (AP) 400 includes multiple antenna groups, one including 404 and 406, another including 408 and 410, and an additional including 412 and 414. In FIG. 4, only two antennas are shown for each antenna group, however, more or fewer antennas may be utilized for each antenna group. Access terminal (AT) 416 is in communication with antennas 412 and 414, where antennas 412 and 414 transmit information to access terminal 416 over forward link 420 and receive information from access terminal 416 over reverse link 418. Access terminal 422 is in communication with antennas 406 and 408, where antennas 406 and 408 transmit information to access terminal 422 over forward link 426 and receive information from access terminal 422 over reverse link 424. In a FDD system, communication links 418, 420, 424 and 426 may use different frequencies for communication. For example, forward link 420 may use a different frequency than that used by reverse link 418.

Each group of antennas and/or the area in which they are designed to communicate is often referred to as a sector of the access point. In the aspect, antenna groups each are designed to communicate to access terminals in a sector, of the areas covered by access point 400.

In communication over forward links 420 and 426, the transmitting antennas of access point 400 utilize beamforming in order to improve the signal-to-noise ratio of forward links for the different access terminals 416 and 424. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 5:
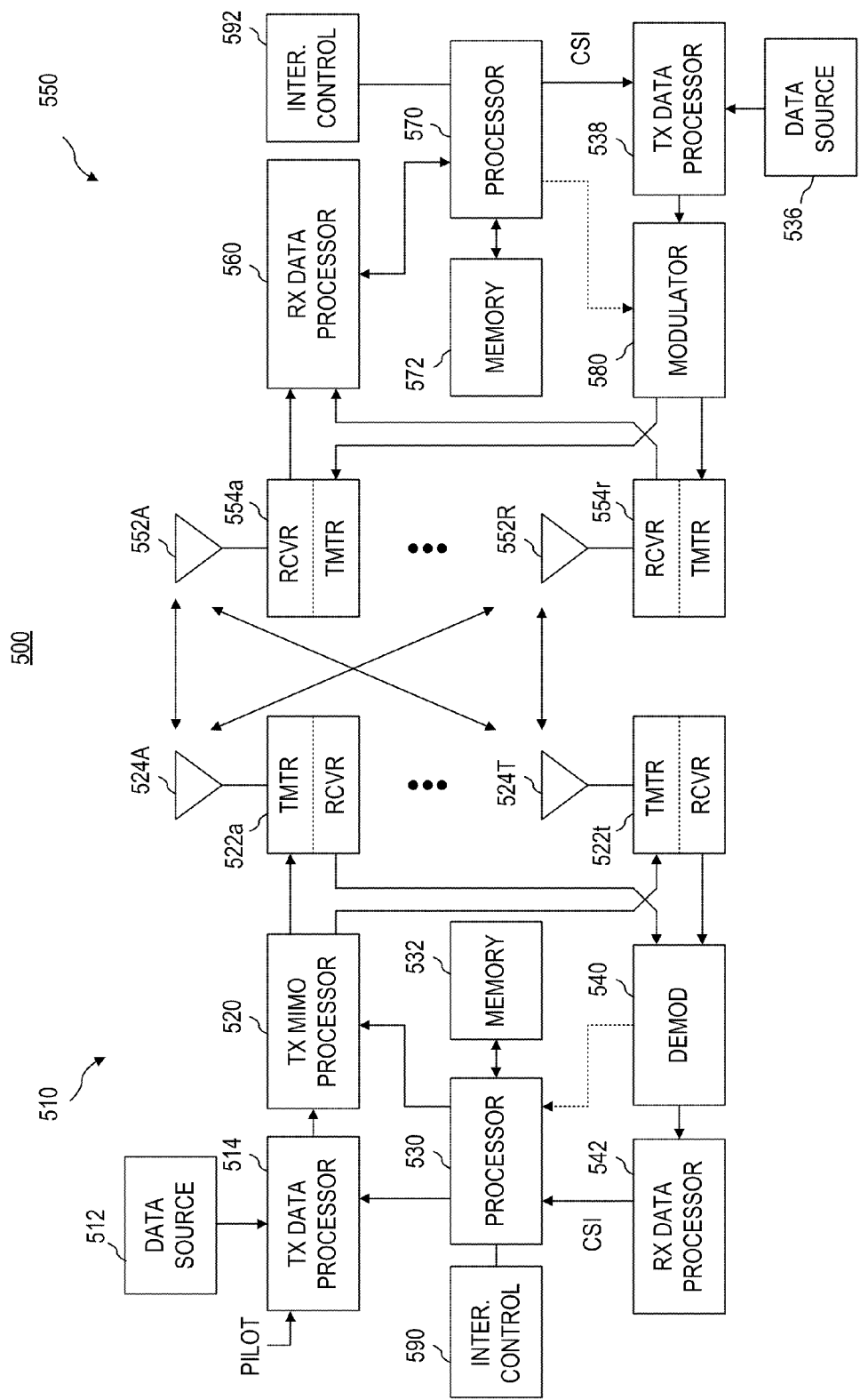
FIG. 5 illustrates a schematic diagram of a node and terminal in a Multiple Input Multiple Output (MIMO) communication system.

The teachings herein may be incorporated into a node (e.g., a device) employing various components for communicating with at least one other node. FIG. 5 depicts several sample components that may be employed to facilitate communication between nodes. Specifically, FIG. 5 illustrates a wireless device 510 (e.g., an access point) and a wireless device 550 (e.g., an access terminal) of a MIMO system 500. At the device 510, traffic data for a number of data streams is provided from a data source 512 to a transmit ("TX") data processor 514.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A data memory 532 may store program code, data, and other information used by the processor 530 or other components of the device 510.

The modulation symbols for all data streams are then provided to a TX MIMO processor 520, which may further process the modulation symbols (e.g., for OFDM). The TX MIMO processor 520 then provides $N_T$ modulation symbol streams to $N_T$ transceivers ("XCVR") 522a through 522t that each has a transmitter (TMTR) and receiver (RCVR). In some aspects, the TX MIMO processor 520 applies beam-forming weights to the symbols of the data streams and to the antenna from which the symbol is being transmitted.

Each transceiver 522a-522t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 522a through 522t are then transmitted from $N_T$ antennas 524a through 524t, respectively.

At the device 550, the transmitted modulated signals are received by $N_T$ antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

A receive ("RX") data processor 560 then receives and processes the $N_T$ received symbol streams from $N_T$ transceivers 554a-554r based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the device 510.

A processor 570 periodically determines which pre-coding matrix to use. The processor 570 formulates a reverse link message comprising a matrix index portion and a rank value portion. A data memory 572 may store program code, data, and other information used by the processor 570 or other components of the device 550.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554a through 554r, and transmitted back to the device 510.

At the device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550. The processor 530 then determines which pre-coding matrix to use for determining the beam-forming weights then processes the extracted message.

FIG. 5 also illustrates that the communication components may include one or more components that perform interference control operations. For example, an interference ("INTER.") control component 590 may cooperate with the processor 530 and/or other components of the device 510 to send/receive signals to/from another device (e.g., device 550). Similarly, an interference control component 592 may cooperate with the processor 570 and/or other components of the device 550 to send/receive signals to/from another device (e.g., device 510). It should be appreciated that for each device 510 and 550 the functionality of two or more of the described components may be provided by a single component. For example, a single processing component may provide the functionality of the interference control component 590 and the processor 530 and a single processing component may provide the functionality of the interference control component 592 and the processor 570.

Figure 6:
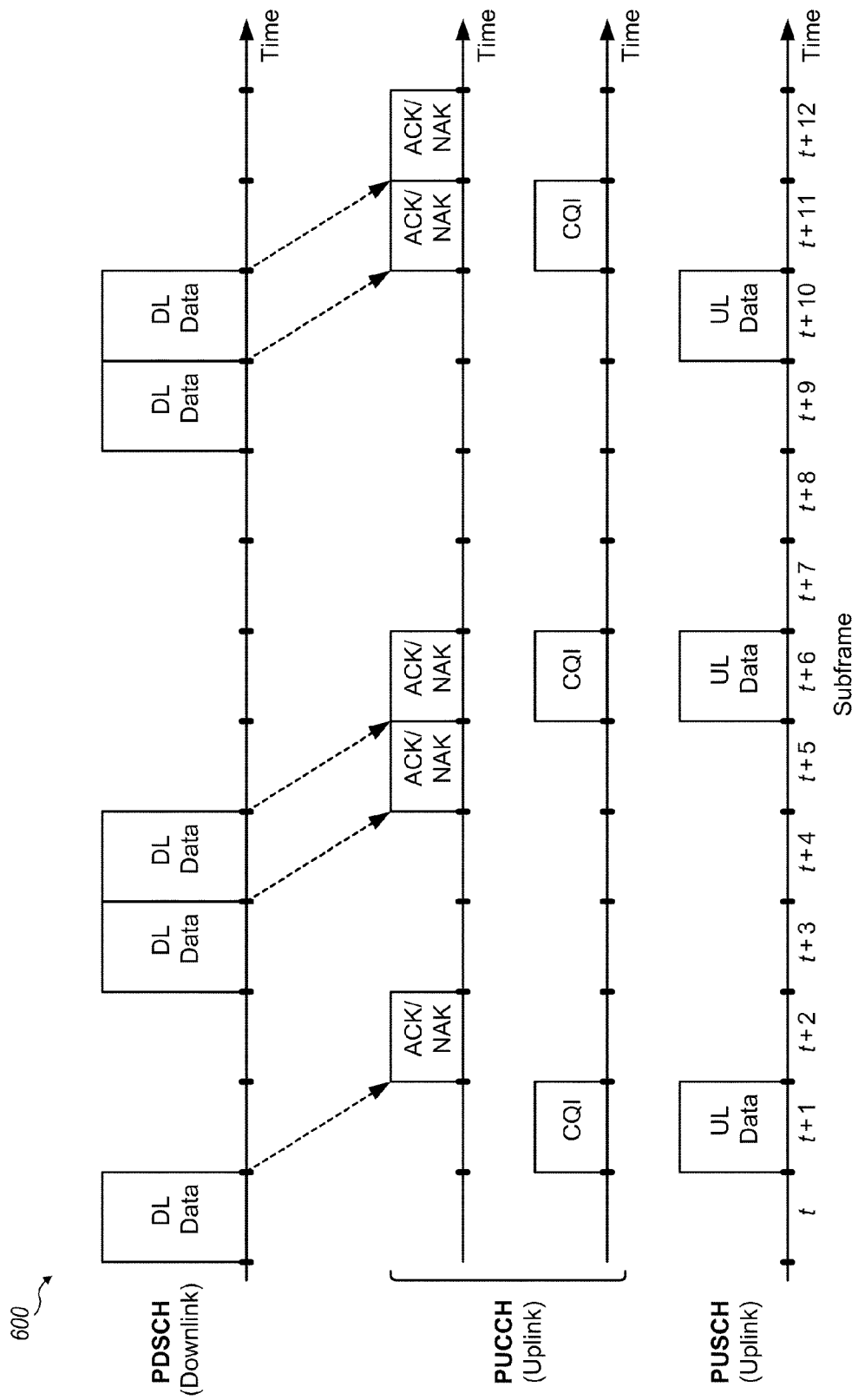
FIG. 6 illustrates diagram of a downlink (DL) transmission by a base node and uplink transmission by user equipment.

FIG. 6 shows downlink (DL) transmission 600 by a Node B and uplink (UL) transmission by a UE. The UE may periodically estimate the downlink channel quality for the Node B and may send channel quality indicator (CQI) information to the Node B. The Node B may use the CQI information and/or other information to select the UE for downlink transmission and to select a suitable modulation and coding scheme (MCS) for data transmission to the UE. The Node B may process and transmit one or more transport blocks to the UE when there is traffic data to send and system resources are available. The UE may process a downlink data transmission from the Node B and may send an acknowledgement (ACK) if a transport block is decoded correctly or a negative acknowledgement (NAK) if the transport block is decoded in error. The Node B may retransmit a transport block if a NAK is received and may transmit a new transport block if an ACK is received. The UE may also transmit one or more transport blocks on the uplink to the Node B when there is traffic data to send and the UE is assigned uplink resources. The UE may transmit traffic data and/or control information, or neither, in any given subframe. The control information may comprise CQI, ACK, and/or other information.

The Node B may send resource assignments on a Physical Downlink Control Channel (PDCCH) and may send traffic data on a Physical Downlink Shared Channel (PDSCH). The UE may send control information on a Physical Uplink Control Channel (PUCCH) and may send traffic data on a Physical Uplink Shared Channel (PUSCH). The data and control channels may also be referred to by other names.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 7:
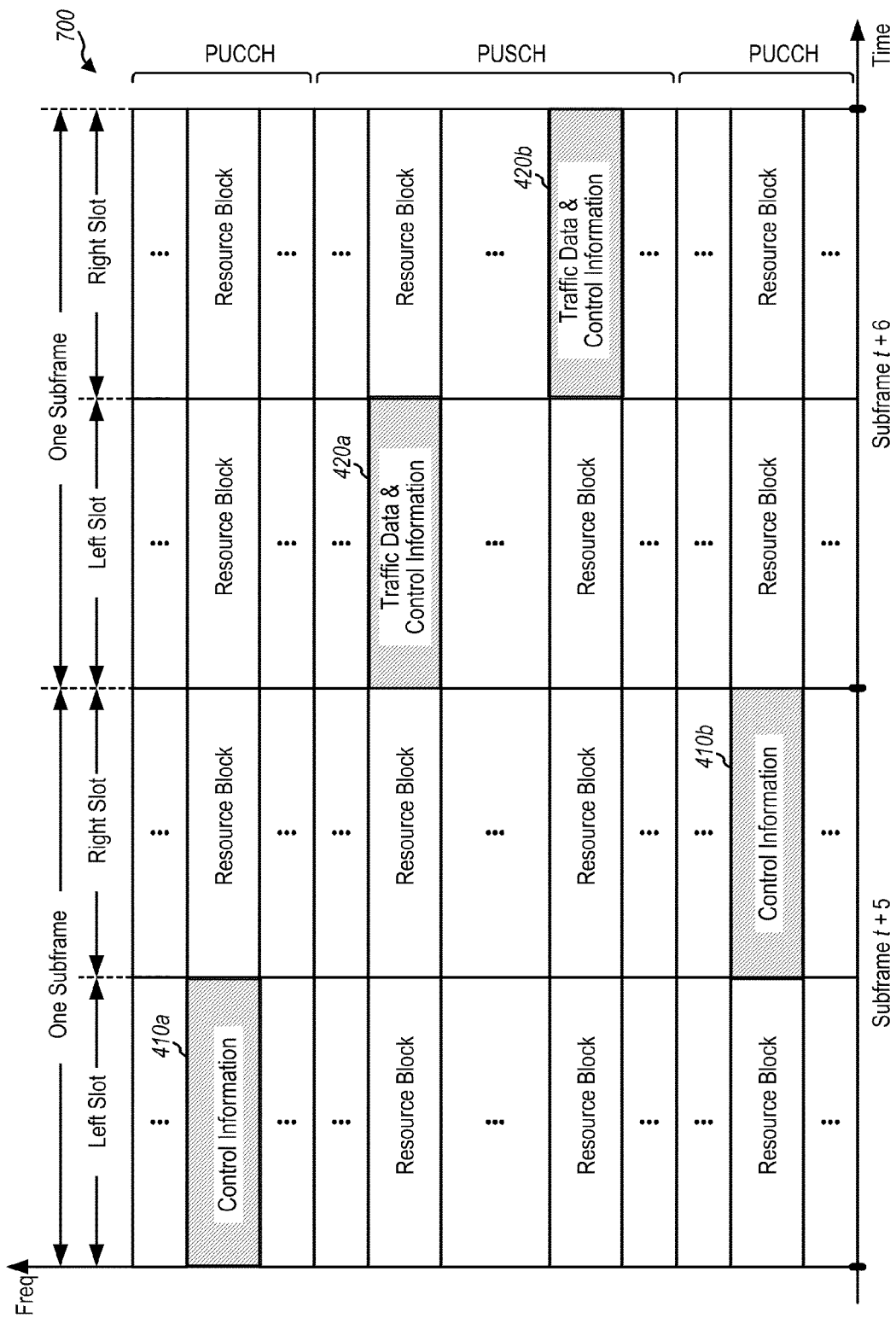
FIG. 7 illustrates a diagram for a transmission structure that may be used for an uplink.

FIG. 7 shows a design of a transmission structure 700 that may be used for the uplink. The transmission timeline may be partitioned into units of subframes. A subframe may have a predetermined duration, e.g., one millisecond (ms), and may be partitioned into two slots. Each slot may include a fixed or configurable number of symbol periods, e.g., six symbol periods for an extended cyclic prefix (CP) or seven symbol periods for a normal cyclic prefix.

For the uplink, K total subcarriers may be available and may be grouped into resource blocks. Each resource block may include N subcarriers (e.g., subcarriers) in one slot. The available resource blocks may be partitioned into a PUSCH region and a PUCCH region. The PUCCH region may include resource blocks near the two edges of the system bandwidth, as shown in FIG. 7. The PUSCH region may include all resource blocks not assigned to the PUCCH region. A given UE may be assigned resource blocks from the PUCCH region to transmit control information to a Node B. The UE may also be assigned resource blocks from the PUSCH region to transmit traffic data to the Node B. The resource blocks may be paired, and an uplink transmission may span both slots in a subframe. For a given PUCCH transmission, one resource block near one band edge may be used in the first slot of a subframe, and another resource block near the opposite band edge may be used in the second slot of the subframe, as shown in FIG. 4.

Figure 8:
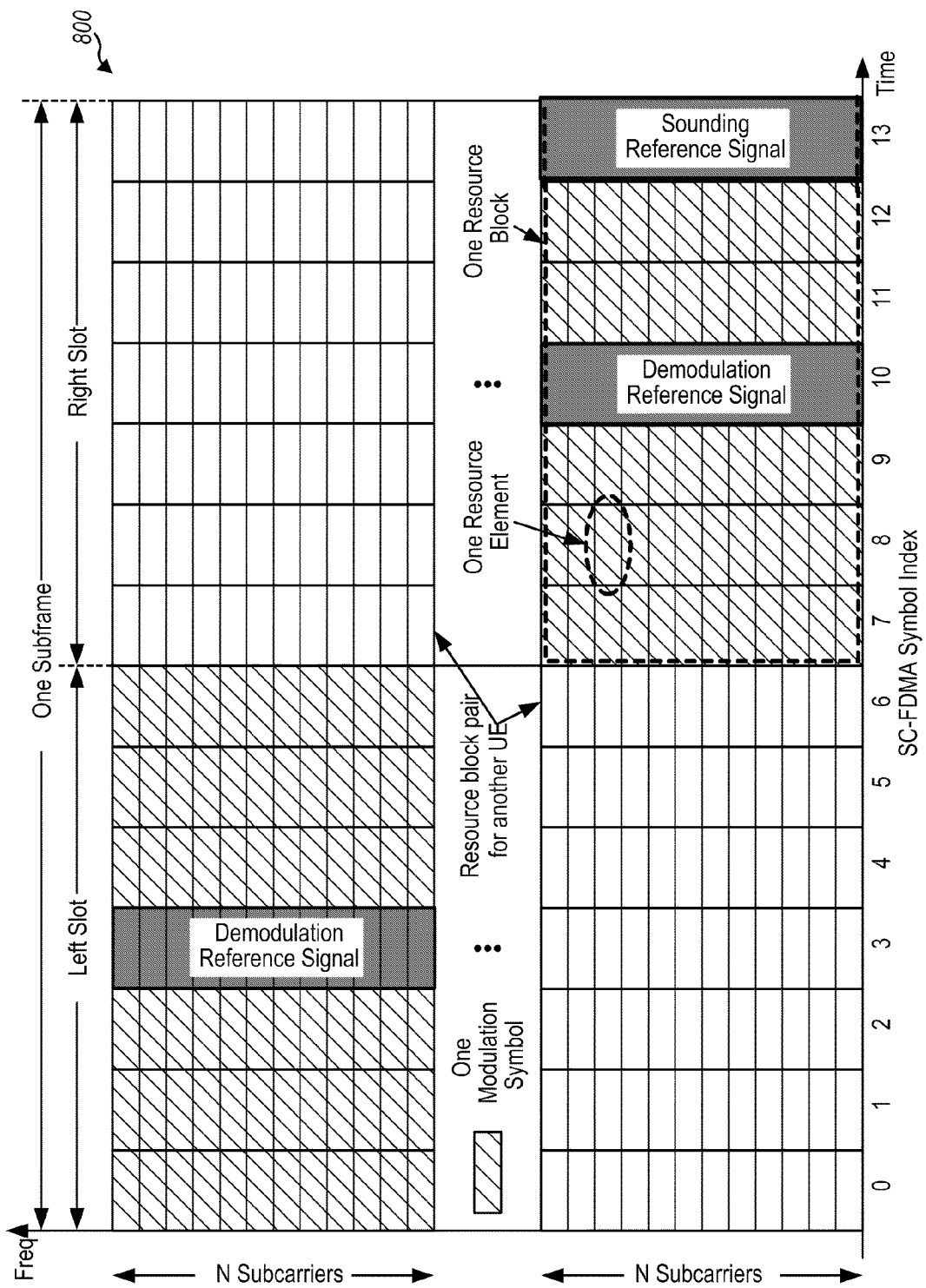
FIG. 8 illustrates a diagram for an example transmission on a Physical Uplink Shared Channel (PUSCH).

FIG. 8 shows an example transmission 800 on the PUSCH. For normal cyclic prefix, each subframe includes two slots, the left slot includes seven symbol periods 0 through 6, and the right slot includes seven symbol periods 7 through 13, as shown in FIG. 5. In the example shown in FIG. 8, a UE is assigned two resource blocks for the PUSCH. The two resource blocks may occupy different sets of subcarriers when frequency hopping is enabled, as shown in FIG. 8. Each resource block includes resource elements. Each resource element covers one subcarrier in one symbol period and may be used to send one modulation symbol.

The UE may transmit a demodulation reference signal (DRS) in one or more symbol periods of each slot. The UE may also transmit a sounding reference signal (SRS) in one or more symbol periods of a subframe. A reference signal may also be referred to as pilot, sounding, etc. The sounding reference signal may also be referred to as a Broadband Pilot Channel (BPICH), may be sent at a predetermined rate, and may or may not be present in a given subframe. The UE may transmit modulation symbols for traffic data and/or control information in resource elements not used for the demodulation and sounding reference signals. The demodulation reference signal may be used by the Node B for coherent detection of the modulation symbols. The sounding reference signal may be used by the Node B to estimate the received signal quality of the uplink for the UE.

In an aspect, power control may be performed for control information and traffic data sent on the uplink. In one design, power control may be implemented with a combination of open-loop and closed-loop power control. Closed-loop power control may be implemented with a combination of an outer loop and an inner loop.

In one design, open-loop power control may be based on energy-per-symbol for a reference signal, which may be denoted as $E_{s,reference\_signal}$. A UE may measure and average $E_{s,reference\_signal}$ over the entire bandwidth over which a Node B transmits the reference signal. For open-loop power control, the transmit power of the UE may be determined as follows:

$$TxPSD_{UL} = -E_{s,reference\_signal} + \text{OpenLoopAdjust, and} \qquad \text{Eqn (1)}$$

$$\text{OpenLoopAdjust} = RxPSD_{UL} + TxPSD_{DL} + NF_{NodeB} + (NoW)_{NodeB} - IoT, \qquad \text{Eqn (2)}$$

where $TxPSD_{UL}$ is a transmit power spectral density (PSD) for the UE, $RxPSD_{UL}$ is a receive PSD at the Node B, $TxPSD_{DL}$ is a transmit PSD for the Node B, $NF_{NodeB}$ is a noise figure at the Node B, $(NoW)_{NodeB}$ is a noise-over at the Node B, and IoT is interference-over-thermal at the Node B.

In one design, closed-loop power control for control information may be implemented with an outer loop and an inner loop. In one design, the outer loop for control information may perform the following:

(i) Adjust a target pilot signal-to-noise-and-interference ratio (SINR) for the PUCCH (if CQI is sent on the PUCCH) to obtain a target CQI erasure rate.

(ii) Adjust the gain of CQI modulation symbol(s) (if CQI is sent on the PUSCH) to obtain the target CQI erasure rate. This assumes that the performance of CQI and ACK, if sent on the PUSCH, is not limited by the pilot on the PUSCH.

(iii) Set the gain of ACK relative to the gain of CQI to obtain a target NAK-to-ACK error rate given that the target CQI erasure rate is achieved.

(iv) Adjust the gain of CQI when CQI switches from PUCCH to PUSCH. The CQI gain may be adjusted by the difference between the transmit power of the BPICH (e.g., over the entire bandwidth) and the transmit power of the pilot on the PUCCH.

(v) Adjust the gain of CQI when CQI switches from PUSCH to PUCCH. The CQI gain may be adjusted by the difference between the transmit power of the BPICH (e.g., over the resource blocks used for the PUCCH) and the transmit power of the pilot on the PUSCH.

(vi) Apply an additional power boost, if needed, for CQI at transition (due to LFDM nature of waveform). The transmit power adjustment may also account for the target SINR of the BPICH and the target pilot SINR of the PUCCH.

In one design, the inner loop for control information may perform the following:

(i) Apply UP/DOWN commands (with one or more suitable step sizes) to maintain the pilot SINR of the PUCCH at the target pilot SINR set by the outer loop (if control information is sent on the PUCCH).

(ii) Apply UP/DOWN commands to maintain the SINR of CQI modulation symbol(s) at the target SINR set by the outer loop (if CQI is sent on the PUSCH).

(iii) Send power control commands on PDCCH, e.g., using grouped power control.

In one design, closed-loop power control for traffic data may be implemented with an outer loop and an inner loop. In one design, the outer loop for traffic data may perform the following:

(i) Adjust a target pilot SINR for the PUSCH to obtain a target Block Error Rate (BLER) with for a target number of HARQ transmissions for each transport block. Handle long-term channel variation.

In one design, the inner loop for traffic data may perform the following:

(i) Maintain the pilot SINR of the PUSCH at the target pilot SINR (as set by the outer loop). Handle short-term channel variation and IoT observed by a UE.

(ii) A delta PSD for each HARQ transmission of a transport block may also be adjusted, e.g., to handle other-cell interference caused by the UE. The adjustment may be made by the UE based on loading information sent on a Loading Information Channel (LICH) or by the Node B.

Figure 9:
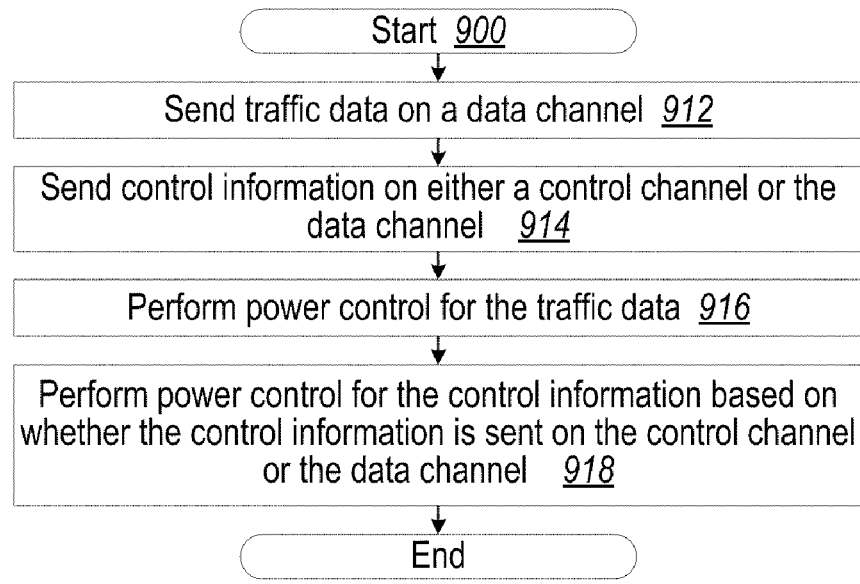
FIG. 9 illustrates a flow diagram for a process for sending traffic data on a data channel.

FIG. 9 shows a design of a process 900 performed by a UE. The UE may send traffic data on a data channel (e.g., the PUSCH) (block 912). The UE may send control information on either a control channel (e.g., the PUCCH) or the data channel (block 914). The UE may perform power control for the traffic data (block 916). The UE may also perform power control for the control information based on different power control mechanisms depending on whether the control information is sent on the control channel or the data channel (block 918).

The UE may receive power control commands for the control information sent on the control channel. The UE may adjust the transmit power of the control channel to maintain a pilot SINR for the control channel at a target SINR. The UE may receive power control commands for the control information sent on the data channel. The UE may adjust a gain for the control information to maintain a SINR for the control information at the target SINR. In one design, the UE may adjust a gain for the control information when switching between the control channel and the data channel. The UE may also apply a power boost for the control information when switching between the control channel and the data channel.

In one design, the UE may adjust the gain for the control information to maintain a target erasure rate for the control information. The control information may comprise ACK information and CQI information. The UE may adjust a first gain for the CQI information to obtain the target erasure rate for the CQI information. The UE may adjust a second gain for the ACK information relative to the first gain to obtain a target NAK-to-ACK error rate for the ACK information.

The UE may adjust the transmit power of the data channel to maintain a pilot SINR at a target SINR. The UE may also adjust the transmit power of the data channel based on interference information for at least one non-serving cell.

Figure 10:
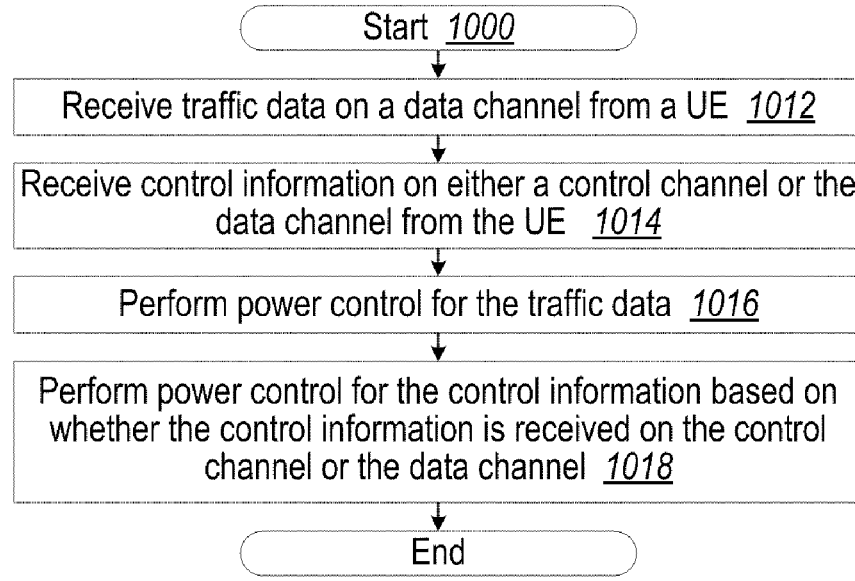
FIG. 10 illustrates a flow diagram for a process for receiving traffic data on a data channel.

FIG. 10 shows a design of a process 1000 performed by a Node B, as described below, or by some other network entity. The Node B may receive traffic data on a data channel (e.g., the PUSCH) from a UE (block 1012). The Node B may receive control information on either a control channel (e.g., the PUCCH) or the data channel from the UE (block 1014). The Node B may perform power control for the traffic data (block 1016). The Node B may also perform power control for the control information based on different power control mechanisms depending on whether the control information is received on the control channel or the data channel (block 1018).

When control information is received on the control channel, the Node B may adjust a target SINR of the control channel to obtain a target erasure rate for the control information. The Node B may then generate power control commands for the control information to maintain a pilot SINR for the control channel at the target SINR. When control information is received on the data channel, the Node B may generate power control commands for the control information to maintain an SINR for the control information at the target SINR. The Node B may also adjust a target SINR of the data channel to obtain a target BLER for the traffic data.

Figure 11:
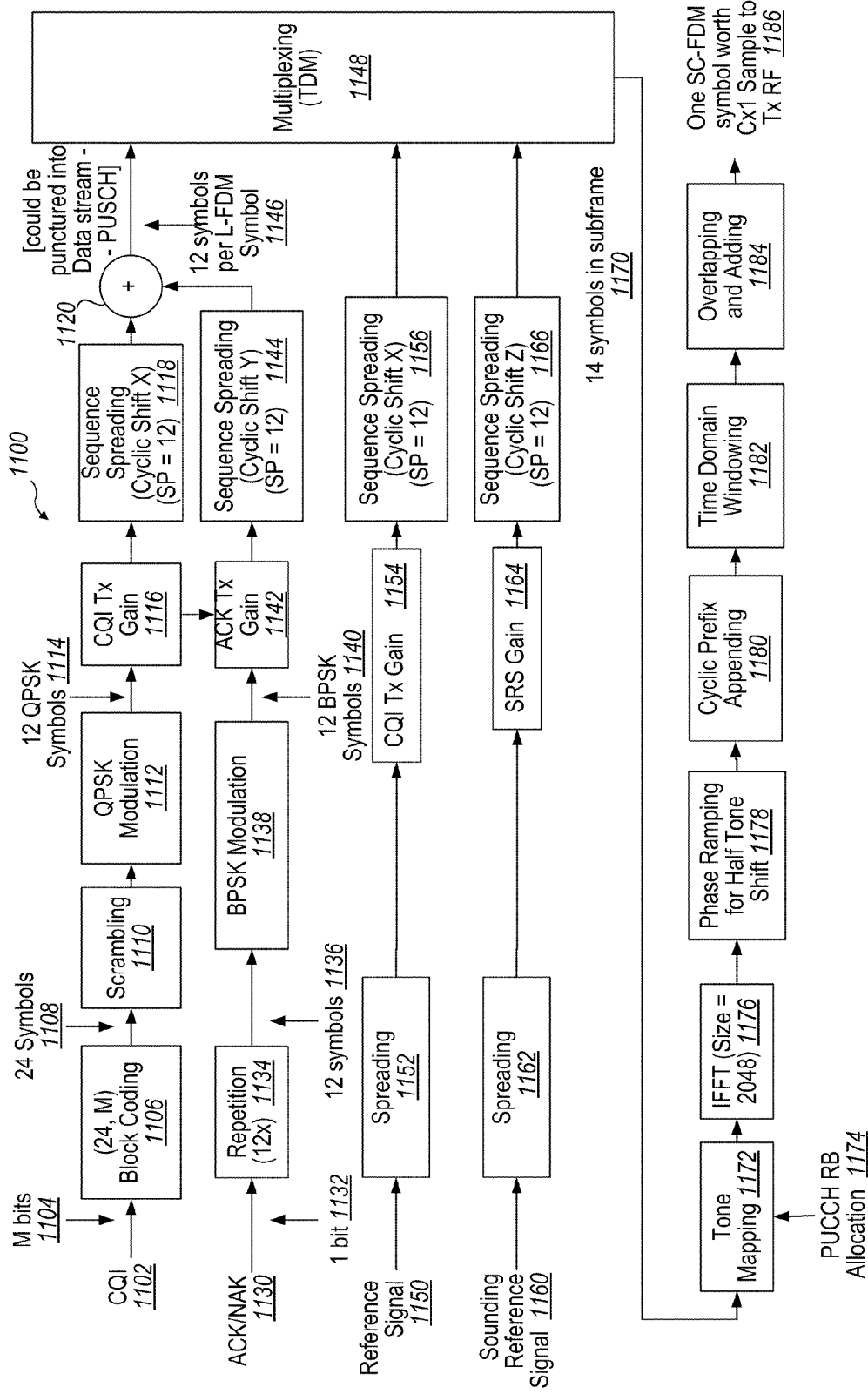
FIG. 11 illustrates a diagram for producing a desired uplink waveform.

In FIG. 11, a system 1100 is depicted for producing a desired uplink (UL) waveform, such as for a Physical Uplink Control Channel (PUCCH). A uniform Channel Quality Indicator (CQI) and Acknowledgement (Ack) structure is supported, such as for CQI alone, Ack alone, or both CQI and Ack transmitted on a PUCCH. Further, the same structure for CQI and/or Ack is provided in a PUCCH and a Physical Uplink Shared Channel (PUSCH). This enables a CQI erasure rate to be maintained at a target regardless of data activity factor or source "burstiness".

A CQI chain 1102 receives M bits CQI data 1104 that passes through a 24, M) block coding component 1106 to produce 24 symbols 1108 that passes through scrambling component 1110, and in turn through Quadrature Phase Shift Keying (QPSK) modulation component 1112 to produce 12 QPSK symbols 1114. The latter passes through a CQI Transmit (Tx) gain component 1116 whose output passes through a sequence spreading component (i.e., cyclic shift X, SP=12) 1118, whose output passes to summer 1120.

An Ack/Nak chain 1130 receives 1-bit acknowledgement data 1132 that passes through a repetition component (12×) 1134 to produce 12 symbols 1136 that passes through Binary Phase Shift Keying (BPSK) modulation component 1138 to produce 12 BPSK symbols 1140 to an Ack Tx gain component 1142 whose gain is in concert with CQI Tx gain component 1116. An output thereof passes through a sequence spreading component (i.e., cyclic shift X, SP=12) 1144, whose output passes to the summer 1120 that produces 12 symbols per L-FDM (localized Frequency Division Multiplex) symbol 1146, which could be punctured into a data stream of PUSCH, as it passes to a Time Division Multiplexing (TDM) multiplexer 1148.

A reference signal chain 1150 passes through a spreading component 1152, through a CQI Tx gain component 1154, through a sequence spreading component (cyclic shift X, SP=12) 1156, to the TDM multiplexer 1148.

A sounding reference chain 1160 passes through a spreading component 1162, through an SRS gain component 1164, through a sequence spreading component (cyclic shift Z, SP=12) 1166, to the TDM multiplexer 1148.

The TDM multiplexer 1148 produces 14 symbols 1170 in a subframe that passes through a tone mapping component 1172 controlled by a PUCCH Resource Block (RB) allocation 1174. Tone mapped symbols pass through an Inverse Fast Fourier Transform (IFFT) component (size=2048) 1176, through a phase ramping for half tone shift component 1178, through a cyclic prefix appending component 1180, through a time domain windowing component 1182, and through an overlapping and adding component 1184 to produce one SC-FDM (Single Carrier Frequency Division Multiplex) symbol worth of Cx1 sample for Radio Frequency (RF) transmitting (Tx) 1186.

Figure 12:
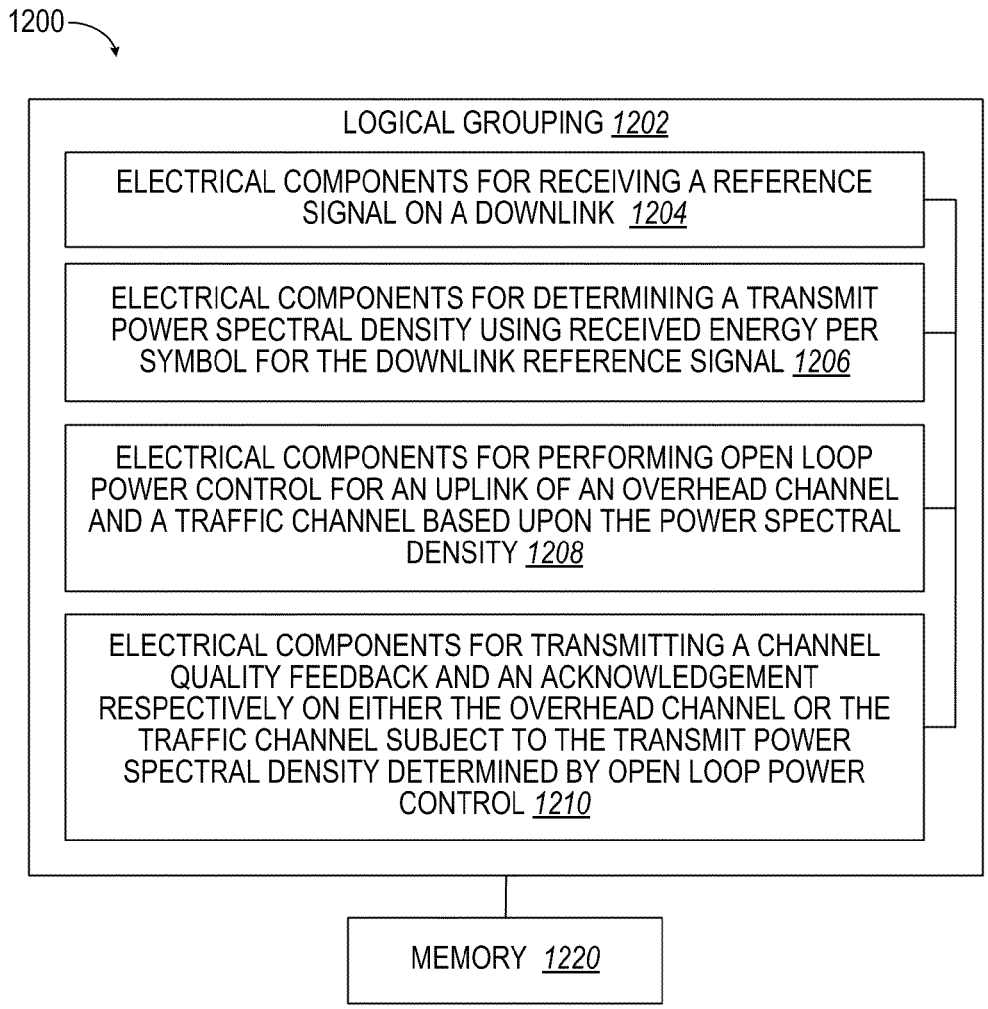
FIG. 12 depicts a block diagram of a logical grouping of user equipment (UE) having electrical components for transmitting an uplink in a wireless communication system.

With reference to FIG. 12, illustrated is a system 1200 for transmitting an uplink in a wireless communication system. For example, system 1200 can reside at least partially within user equipment (UE). It is to be appreciated that system 1200 is represented as including functional blocks, which can be functional blocks that represent functions implemented by a computing platform, processor, software, or combination thereof (e.g., firmware). System 1200 includes a logical grouping 1202 of electrical components that can act in conjunction. For instance, logical grouping 1202 can include an electrical component for receiving a reference signal on a downlink 1204. Moreover, logical grouping 1202 can include an electrical component for determining a transmit power spectral density using received energy per symbol for the reference signal 1206. In addition, logical grouping 1202 can include an electrical component for performing open loop power control for an uplink of an overhead channel and a traffic channel based upon the transmit power spectral density 1208. Also, logical grouping 1202 can include an electrical component for transmitting a channel quality feedback and an acknowledgement respectively subject to the transmit power spectral density determined by open loop power control on either the overhead channel or the traffic channel 1210. Additionally, system 1200 can include a memory 1220 that retains instructions for executing functions associated with electrical components 1204-1210. While shown as being external to memory 1220, it is to be understood that one or more of electrical components 1204-1210 can exist within memory 1220.

Figure 13:
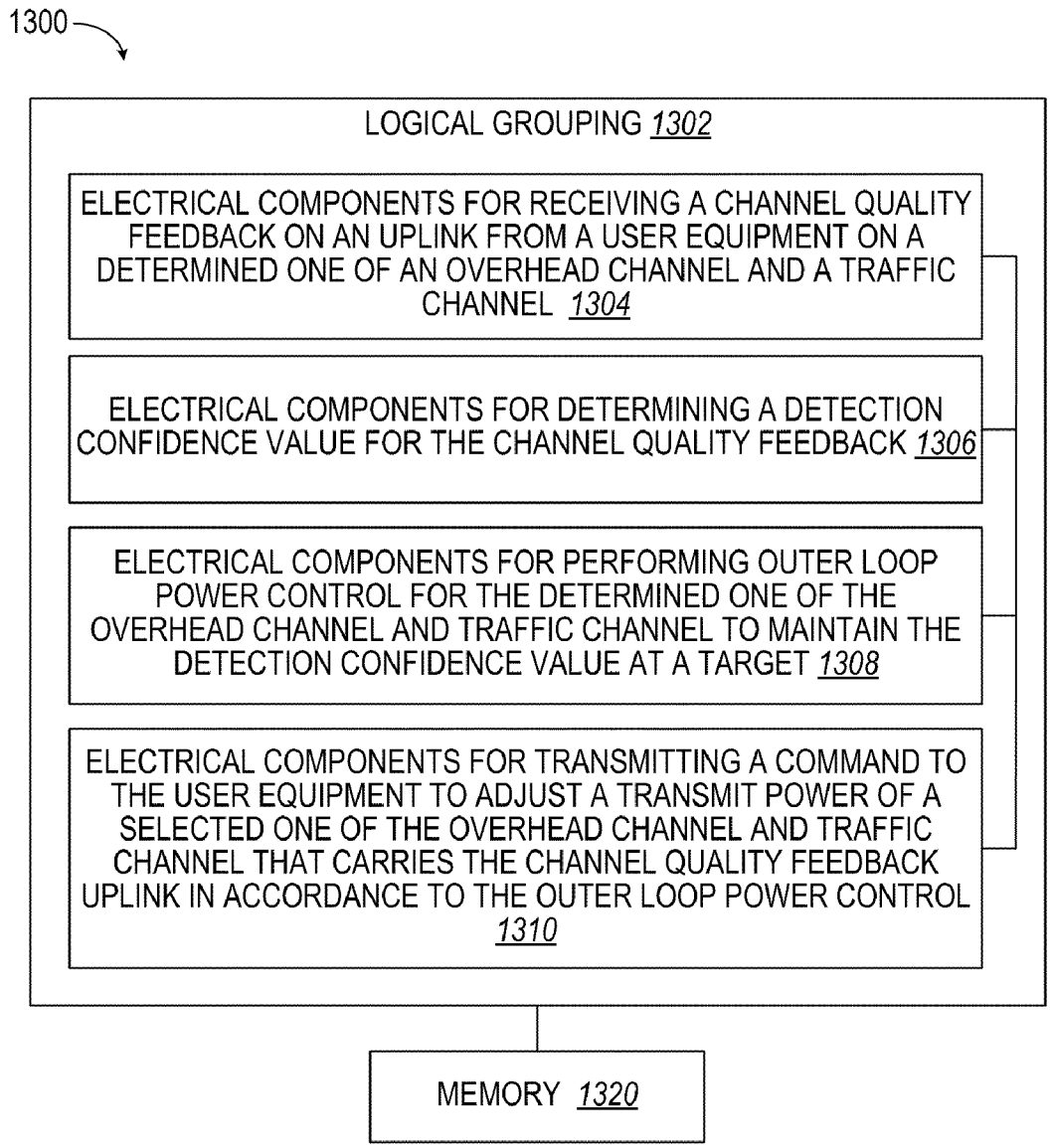
FIG. 13 depicts a block diagram of a logical grouping of a base node having electrical components for receiving an uplink in a wireless communication system.

With reference to FIG. 13, illustrated is a system 1300 for receiving an uplink in a wireless communication system. For example, system 1300 can reside at least partially within a network entity (e.g., evolved base node). It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for receiving a channel quality feedback on an uplink from user equipment on a determined one of an overhead channel and a traffic channel 1304. Moreover, logical grouping 1302 can include an electrical component for determining a detection confidence value for the channel quality feedback 1306. In addition, logical grouping 1302 can include an electrical component for performing outer loop power control for the determined one of the overhead channel and traffic channel to maintain the detection confidence value at a target 1308. Also, logical grouping 1302 can include an electrical component for transmitting a command to the user equipment to adjust a transmit power of a selected one of the overhead channel and traffic channel that carries the channel quality feedback uplink in accordance to performing outer loop power control 1310. Additionally, system 1300 can include a memory 1320 that retains instructions for executing functions associated with electrical components 1304-1310. While shown as being external to memory 1320, it is to be understood that one or more of electrical components 1304-1310 can exist within memory 1320.

Figure 14:
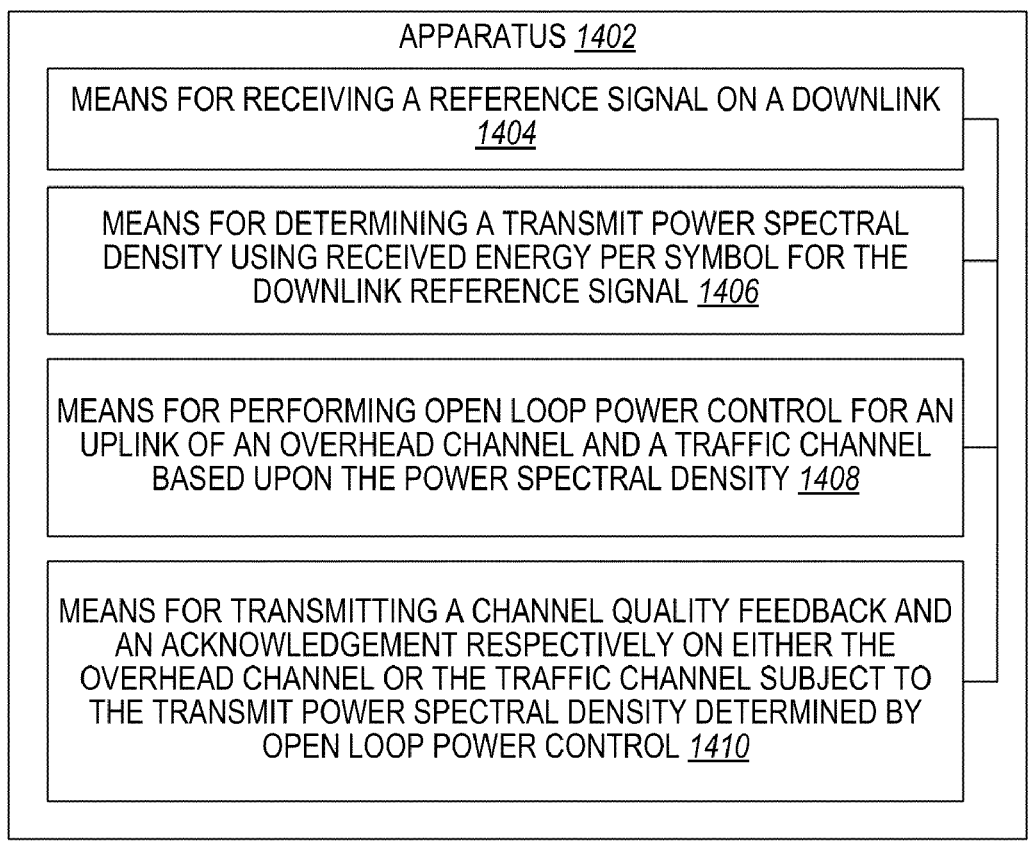
FIG. 14 depicts a block diagram of an apparatus having means for transmitting an uplink in a wireless communication system

In FIG. 14, an apparatus 1402 is depicted for transmitting an uplink in a wireless communication system. Means 1404 are provided for receiving a reference signal on a downlink. Means 1406 are provided for determining a transmit power spectral density using received energy per symbol for the downlink reference signal. Means 1408 are provided for performing open loop power control for an uplink of an overhead channel and a traffic channel based upon the transmit power spectral density. Means 1410 are provided for transmitting a channel quality feedback and an acknowledgement respectively subject to the transmit power spectral density determined by open loop power control on either the overhead channel or the traffic channel.

Figure 15:
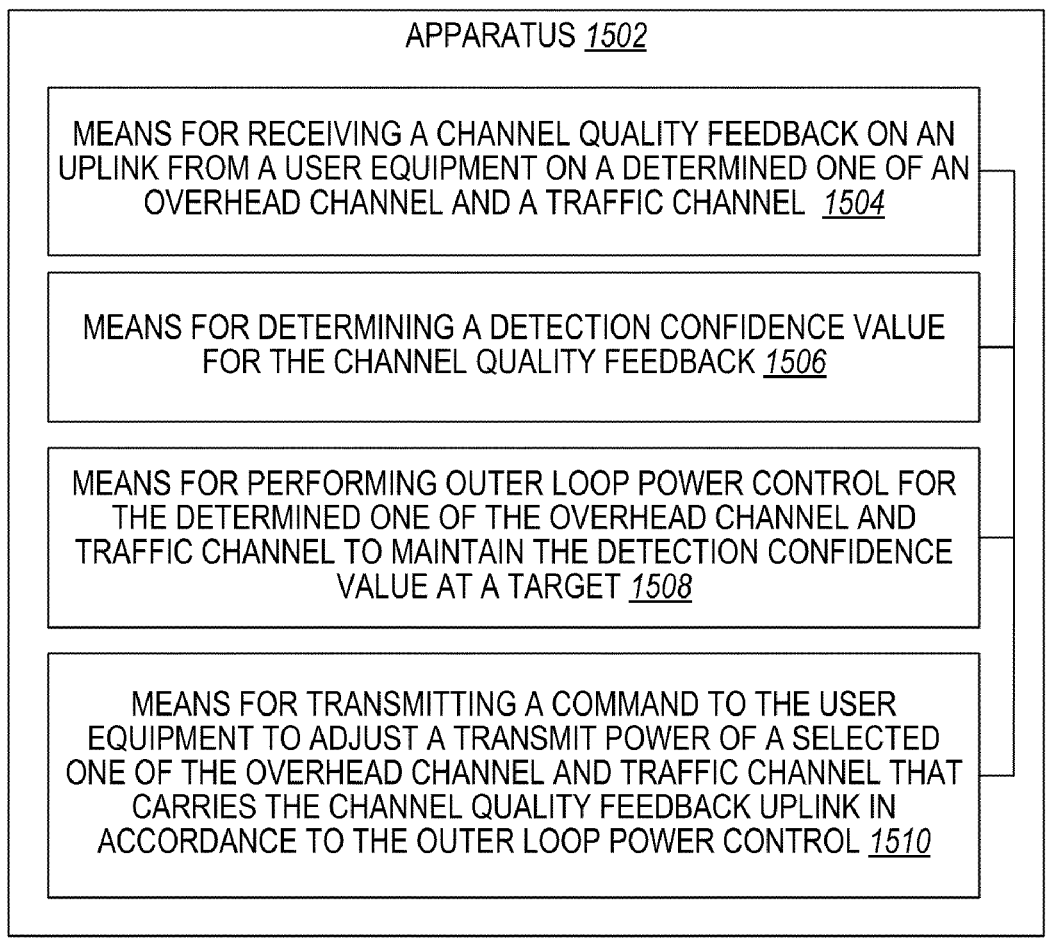
FIG. 15 depicts a block diagram of an apparatus having means for receiving an uplink in a wireless communication system.

In FIG. 15, an apparatus 1502 is depicted for receiving an uplink in a wireless communication system. Means 1504 are provided for receiving a channel quality feedback on an uplink from user equipment on a determined one of an overhead channel and a traffic channel. Means 1506 are provided for determining a detection confidence value for the channel quality feedback. Means 1508 are provided for performing outer loop power control for the determined one of the overhead channel and traffic channel to maintain the detection confidence value at a target. Means 1510 are provided for transmitting a command to the user equipment to adjust a transmit power of a selected one of the overhead channel and traffic channel that carries the channel quality feedback uplink in accordance to performing outer loop power control.

It should be appreciated with the benefit of the present disclosure that a method, computer program product, and apparatus provide for wireless communication by sending traffic data on a data channel, sending control information on either a control channel or the data channel, performing power control for the traffic data, and performing power control for the control information based on whether the control information is sent on the control channel or the data channel.

In one particular aspect for switching between Physical Uplink Control Channel (PUCCH) and Physical Uplink Shared Channel (PUSCH), a method, computer program product, and apparatus perform power control for the control information by adjusting a gain for the control information when switching between the control channel and the data channel. In another particular aspect, a method, computer program product, and apparatus perform power control for the control information by applying a power boost for the control information when switching between the control channel and the data channel.

In another particular aspect, a method, computer program product, and apparatus perform power control for the control information by adjusting a gain for the control information to maintain a target erasure rate for the control information when sent on the data channel. In additional aspect, a method, computer program product, and apparatus provide that, for control information comprising acknowledgement (ACK) information and channel quality indicator (CQI) information, performing power control for the control information is by adjusting a first gain for the CQI information to obtain a target erasure rate for the CQI information, and by adjusting a second gain for the ACK information relative to the first gain to obtain a target NAK-to-ACK error rate for the ACK information.

In an additional particular aspect, a method, computer program product, and apparatus provide performing power control for the control information by receiving power control commands for the control information sent on the control channel, and by adjusting transmit power of the control channel to maintain a pilot signal-to-noise-and-interference ratio (SINR) at a target SINR. In a further aspect, a method, computer program product, and apparatus provide performing power control for the control information by receiving power control commands for the control information sent on the data channel, and by adjusting a gain for the control information to maintain a signal-to-noise-and-interference ratio (SINR) for the control information at a target SINR.

In a further particular aspect for inner loop for data, a method, computer program product, and apparatus provide performing power control for the traffic data by adjusting the transmit power of the data channel to maintain a pilot SINR at a target SINR.

In a yet one particular aspect for Interference over Thermal (IoT) noise, a method, computer program product, and apparatus provide performing power control for the traffic data by adjusting the transmit power of the data channel based on interference information for at least one non-serving cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for receiving an uplink in a wireless communication system, the method comprising:
   receiving a channel quality feedback on an uplink from a user equipment on a determined one of an overhead channel and a traffic channel;
   determining a detection confidence value for the channel quality feedback;
   performing outer loop power control for the determined one of the overhead channel and traffic channel to maintain the detection confidence value at a target; and
   transmitting a command to the user equipment to adjust a transmit power of a selected one of the overhead channel and traffic channel that carries the channel quality feedback in accordance to performing outer loop power control.

2. The method of claim 1, wherein the detection confidence value comprises an erasure rate.

3. The method of claim 1, further comprising performing outer loop power control for the overhead channel.

4. The method of claim 3, further comprising performing closed loop power control for the overhead channel by transmitting a selected one of an up power control command and a down power control command to the user equipment via a downlink control channel using a grouped power control to adjust the transmit power of the selected one of the overhead channel and traffic channel.

5. The method of claim 3, further comprising:
   receiving the channel quality feedback on the overhead channel of the uplink; and
   transmitting the command to the user equipment to adjust the transmit power of the overhead channel of the uplink in accordance to performing outer loop power control.

6. The method of claim 3, further comprising performing closed loop power control for the overhead channel by transmitting a selected one of an up power control command and a down power control command to the user equipment to adjust the transmit power of the overhead channel of the uplink in accordance to performing outer loop power control.

7. The method of claim 3, further comprising receiving the channel quality feedback on the traffic channel of the uplink.

8. The method of claim 3, further comprising performing closed loop power control for the overhead channel by transmitting a selected one of an up power control command and a down power control command to the user equipment to adjust the transmit power of the traffic channel of the uplink in accordance to performing outer loop power control.

9. The method of claim 8, further comprising transmitting the command to the user equipment to adjust a gain of a Channel Quality Indicator (CQI) modulation symbol for the channel quality feedback.

10. The method of claim 8, further comprising:
    determining a block error rate for the uplink; and
    performing outer loop power control to maintain the detection confidence value at the target and to maintain a block error rate for the traffic channel to achieve a desired number of sub-packets.

11. The method of claim 3, further comprising receiving the channel quality feedback on the uplink from a user equipment switching from a selected one to the other of the overhead channel and the traffic channel.

12. The method of claim 11, further comprising transmitting the command to the user equipment to adjust the transmit power of the overhead channel of the uplink in accordance to performing outer loop power control with a power boost when transitioning from the selected one to the other of the overhead channel and the traffic channel to accommodate a nature of a single carrier frequency division multiplex waveform.

13. The method of claim 12, further comprising determining the power boost to account for a difference between a first target value for a signal-to-noise ratio for a broadcast pilot channel and a second target value for a signal-to-noise ratio for a pilot of the traffic channel.

14. The method of claim 11, further comprising:
    receiving the channel quality feedback on the uplink from a user equipment switching from the overhead channel to the traffic channel; and
    performing outer loop power control to maintain the detection confidence value at the target based upon a difference in transmit power between a broadcast pilot channel over an entire bandwidth and a pilot for the overhead channel.

15. The method of claim 11, further comprising:
    receiving the channel quality feedback on the uplink from a user equipment switching from the traffic channel to the overhead channel; and
    performing outer loop power control to maintain the detection confidence value at the target based upon a difference in transmit power between a broadcast pilot channel over a plurality of resources blocks of the overhead channel and a pilot for the traffic channel.

16. The method of claim 3, further comprising transmitting a gain for an uplink acknowledgement set relative to the command to the user equipment to adjust the transmit power of the selected one of the overhead channel and the traffic channel to maintain a target not acknowledged (Nak) to acknowledged (Ack) error rate.

17. The method of claim 1, further comprising performing outer loop power control for the traffic channel.

18. The method of claim 17, further comprising performing outer loop power control for the traffic channel by increasing a pilot signal-to-noise ratio for a pilot the traffic channel to achieve a threshold value for a block error rate for a number of sub-packets.

19. The method of claim 18, further comprising setting increments for increasing the pilot signal-to-noise ratio for smooth dynamics and low setpoint bias.

20. The method of claim 17, further comprising performing outer loop power control for the traffic channel by setting a pilot signal-to-noise ratio setpoint to ensure a target traffic block error rate and a threshold value for a number of sub-packets and to ensure a target erasure rate is achieved when channel quality feedback and data are transmitted on the traffic channel.

21. The method of claim 17, further comprising performing closed loop power control for the traffic channel to maintain a pilot signal-to-noise ratio for the traffic channel at a level defined by performing outer loop power control for the traffic channel based upon an overhead value of a downlink control channel.

22. The method of claim 21, further comprising adjusting a command for a change in power spectral density of transmit power for the traffic channel in response to an interference signal caused by a second user equipment.

23. A computer program product for receiving an uplink in a wireless communication system, the computer program product comprising:
at least one computer readable storage medium storing computer executable instructions comprising:
a first set of codes for receiving a channel quality feedback on an uplink from a user equipment on a determined one of an overhead channel and a traffic channel;
a second set of codes for determining a detection confidence value for the channel quality feedback;
a third set of codes for performing outer loop power control for the determined one of the overhead channel and traffic channel to maintain the detection confidence value at a target; and
a fourth set of codes for transmitting a command to the user equipment to adjust a transmit power of a selected one of the overhead channel and traffic channel that carries the channel quality feedback in accordance to performing outer loop power control.

24. An apparatus for receiving an uplink in a wireless communication system, the apparatus comprising:
means for receiving a channel quality feedback on an uplink from a user equipment on a determined one of an overhead channel and a traffic channel;
means for determining a detection confidence value for the channel quality feedback;
means for performing outer loop power control for the determined one of the overhead channel and traffic channel to maintain the detection confidence value at a target; and
means for transmitting a command to the user equipment to adjust a transmit power of a selected one of the overhead channel and traffic channel that carries the channel quality feedback in accordance to performing outer loop power control.

25. An apparatus for receiving an uplink in a wireless communication system, the apparatus comprising:

a receiver for receiving a channel quality feedback on an uplink from a user equipment on a determined one of an overhead channel and a traffic channel;
a computing platform for determining a detection confidence value for the channel quality feedback and for performing outer loop power control for the determined one of the overhead channel and traffic channel to maintain the detection confidence value at a target; and
a transmitter for transmitting a command to the user equipment to adjust a transmit power of a selected one of the overhead channel and traffic channel that carries the channel quality feedback in accordance to performing outer loop power control.

26. The apparatus of claim 25, wherein the detection confidence value comprises an erasure rate.

27. The apparatus of claim 25, wherein the computing platform is further for performing outer loop power control for the overhead channel.

28. The apparatus of claim 27, wherein the computing platform is further for performing closed loop power control for the overhead channel by transmitting a selected one of an up power control command and a down power control command to the user equipment via a downlink control channel using a grouped power control to adjust the transmit power of the selected one of the overhead channel and traffic channel.

29. The apparatus of claim 27, wherein
the receiver is further for receiving the channel quality feedback on an overhead channel of the uplink; and
the transmitter is further for transmitting the command to the user equipment to adjust the transmit power of the overhead channel of the uplink in accordance to performing outer loop power control.

30. The apparatus of claim 27, wherein the computing platform is further for performing closed loop power control for the overhead channel by transmitting a selected one of an up power control command and a down power control command to the user equipment to adjust the transmit power of the overhead channel of the uplink in accordance to performing outer loop power control.

31. The apparatus of claim 27, wherein the receiver is further for receiving the channel quality feedback on the traffic channel of the uplink.

32. The apparatus of claim 27, wherein the computing platform is further for performing closed loop power control for the overhead channel by transmitting a selected one of an up power control command and a down power control command to the user equipment to adjust the transmit power of the traffic channel of the uplink in accordance to performing outer loop power control.

33. The apparatus of claim 32, wherein the transmitter is further for transmitting the command to the user equipment to adjust a gain of a Channel Quality Indicator (CQI) modulation symbol for the channel quality feedback.

34. The apparatus of claim 32, wherein the computing platform is further for determining a block error rate for the uplink, and for performing outer loop power control to maintain the detection confidence value at the target and to maintain a block error rate for the traffic channel to achieve a desired number of sub-packets.

35. The apparatus of claim 27, wherein the receiver is further for receiving the channel quality feedback on the uplink from a user equipment switching from a selected one to the other of the overhead channel and the traffic channel.

36. The apparatus of claim 35, wherein the transmitter is further for transmitting the command to the user equipment to adjust the transmit power of the overhead channel of the uplink in accordance to performing outer loop power control with a power boost when transitioning from the selected one to the other of the overhead channel and the traffic channel to accommodate a nature of a single carrier frequency division multiplex waveform.

37. The apparatus of claim 36, wherein the computing platform is further for determining the power boost to account for a difference between a first target value for a difference between a signal-to-noise ratio for a broadcast pilot channel and a second target value for a signal-to-noise ratio for a pilot of the traffic channel.

38. The apparatus of claim 35, wherein
the receiver is further for receiving the channel quality feedback on the uplink from a user equipment switching from the overhead channel to the traffic channel; and
the computing platform is further for performing outer loop power control to maintain the detection confidence value at the target based upon a difference in transmit power between a broadcast pilot channel over an entire bandwidth and a pilot for the overhead channel.

39. The apparatus of claim 35, wherein
the receiver is further for receiving the channel quality feedback on the uplink from a user equipment switching from the traffic channel to the overhead channel; and
the computing platform is further for performing outer loop power control to maintain the detection confidence value at the target based upon a difference in transmit power between a broadcast pilot channel over a plurality of resources blocks of the overhead channel and a pilot for the traffic channel.

40. The apparatus of claim 27, wherein the transmitter is further for transmitting a gain for an uplink acknowledgement set relative to the command to the user equipment to adjust the transmit power of the selected one of the overhead channel and the traffic channel to maintain a target not acknowledged (Nak) to acknowledged (Ack) error rate.

41. The apparatus of claim 25, wherein the computing platform is further for performing outer loop power control for the traffic channel.

42. The apparatus of claim 41, wherein the computing platform is further for performing outer loop power control for the traffic channel by increasing a pilot signal-to-noise ratio for a pilot the traffic channel to achieve a threshold value for a block error rate for a number of sub-packets.

43. The apparatus of claim 42, wherein the computing platform is further for setting increments for increasing the pilot signal-to-noise ratio for smooth dynamics and low setpoint bias.

44. The apparatus of claim 41, wherein the computing platform is further for performing outer loop power control for the traffic channel by setting a pilot signal-to-noise ratio setpoint to ensure a target traffic block error rate and a threshold value for a number of sub-packets and to ensure a target erasure rate is achieved when channel quality feedback and data are transmitted on the traffic channel.

45. The apparatus of claim 41, wherein the computing platform is further for performing closed loop power control for the traffic channel to maintain a pilot signal-to-noise ratio for the traffic channel at a level defined by performing outer loop power control for the traffic channel based upon an overhead value of a downlink control channel.

46. The apparatus of claim 45, wherein the computing platform is further for adjusting a command for a change in power spectral density of transmit power for the traffic channel in response to an interference signal caused by a second user equipment.

* * * * *